United States Patent [19]

Mullen et al.

[11] Patent Number: 5,007,760
[45] Date of Patent: Apr. 16, 1991

[54] DEVICE FOR ALIGNING AND MOUNTING A COPIER OR PRINTER SUBSYSTEM

[75] Inventors: Charles E. Mullen, Spencerport; Arthur H. Crater, Warsaw, both of N.Y.

[73] Assignee: Eastman Kodak Company, Rochester, N.Y.

[21] Appl. No.: 464,274

[22] Filed: Jan. 12, 1990

Related U.S. Application Data

[63] Continuation-in-part of Ser. No. 225,498, Jul. 28, 1988, abandoned.

[51] Int. Cl.⁵ .............................................. F16B 43/00
[52] U.S. Cl. .................................. 403/13; 403/408.1; 29/57; 29/238; 29/DIG. 1; 411/154; 411/374
[58] Field of Search ................. 29/57, 238, 418, 525.2, 29/759, DIG. 1; 16/2; 52/704; 411/82, 147, 148, 154, 155, 156, 368, 371, 374; 248/205.3; 403/408.1, 3, 4, 13

[56] References Cited

U.S. PATENT DOCUMENTS

| | | | |
|---|---|---|---|
| 797,925 | 8/1905 | Thomas | 411/368 |
| 3,031,212 | 4/1962 | Oliver | 411/258 X |
| 3,065,538 | 10/1962 | Simi | 411/155 X |
| 3,532,316 | 10/1970 | Mathes | 248/205.3 |
| 4,932,805 | 6/1990 | Mullen et al. | 411/82 X |

FOREIGN PATENT DOCUMENTS

| | | | |
|---|---|---|---|
| 3531213 | 3/1987 | Fed. Rep. of Germany | 411/258 |
| 1001925 | 8/1965 | United Kingdom | 16/2 |

*Primary Examiner*—Mark Rosenbaum
*Assistant Examiner*—Peter Dungba Vo
*Attorney, Agent, or Firm*—Tallam I. Nguti

[57] ABSTRACT

An apparatus for first aligning by trial and error, and then mounting or fastening a subsystem of an electrostatographic copier or printer such that the subsystem thereafter can be removed, serviced, and then remounted or reinstalled in precise alignment without further need of such initial trial and error aligning thereof. The apparatus include an aligning device for initially aligning by marking an aligned position through a first alignment and screw mounting aperture in the mounting portion of the subsystem, and for forming a laterally sealed cavity with such mounting portion. The device has front and back sides, a screw or bolt mounting apertures therethrough, a backside recess, and adhesive introduction perforations therein. The apparatus also include a mounting or fastening means such as a mounting screw, and an adhesive for permanently bonding the aligning device to the mounting portion, thereby also permanently aligning and marking the aligned position through the mounting portion such that the subsystem thereafter can be removed, serviced, and then remounted or reinstalled in precise alignment without further need of such initial trial and error aligning thereof.

6 Claims, 2 Drawing Sheets

DEVICE FOR ALIGNING AND MOUNTING A COPIER OR PRINTER SUBSYSTEM

RELATED APPLICATIONS

This application is a continuation-in-part of U.S. application Ser. No. 07/225,498 filed July 28, 1988 now abandoned in the names Charles E. Mullen and Arthur H. Crater, entitled "METHOD AND APPARATUS FOR ALIGNING AND MOUNTING MACHINE COMPONENTS."

BACKGROUND OF THE INVENTION

This invention relates to electrostatographic copiers and printers. More particularly, the invention relates to a device for use in first aligning, by trial and error, an operating subsystem, such as a copy sheet registration assembly in such a copier or printer, and for then mounting such a subsystem to the frame of the copier or printer so that the subsystem can thereafter be removed from the copier or printer, serviced, and then reinstalled, that is, remounted therein in alignment without further need of such trial and error aligning thereof.

Electrostatographic copiers and printers, which can produce or reproduce copies of an original image on suitable receivers such as copy sheets of paper, include many components and operating subsystems mounted therein. Although some such components merely require mounting, that is, fastening, for example by gluing or by a screw or other such fastener, others, particularly operating subsystems such as a copy registration assembly, must first be precisely aligned before being mounted. Furthermore, some such other operating subsystems occasionally have to be removed from the copier or printer, serviced, and then reinstalled therein in alignment.

Typically, components which merely require fastening, as by gluing the component or a part thereof to the support frame of the copier or printer, or as with a screw or other such fastener, include enabling and particular features for such mounting. For example, the base of the component to be mounted may be coated with an adhesive, or means for introducing adhesive into such a base may be provided. The latter adhesive base bonding technique is disclosed for example in U.S. Pat. No. 3,532,316 issued Oct. 6, 1970 to G. Mathes. The technique involves forming a recess in such base, as well as, perforations therethrough for introducing adhesive into such recess. The introduced adhesive permanently bonds the base of the component directly to a foundation or a support frame.

When such mounting or fastening is with a screw or bolt for examples, screw or bolt mounting apertures of the same size are formed in the support frame of the copier or printer as well as in the component to be mounted. To ensure tightness of the mounting or fastening, such screw mounting apertures are usually substantially the same size as the major diameter of the screw or bolt being used. Additionally, a washer, usually a thin flat ring or plate with a screw or bolt mounting aperture therein, may also be used in such a mounting in order to ensure such tightness, and further in order to prevent damage from rotational friction of the screw or bolt against the component being mounted.

Although washers and their use as such are aged-old and well known, specific modified washer type devices have evolved for additionally solving particular problems or achieving particular purposes. For example, as disclosed in U.S. Pat. No. 797,925 issued Aug. 22, 1905 to G. P. Thomas, such a washer having a front side and a back side, was modified to include a front side recess in addition to a bolt mounting aperture. The front side recess receives and retains complimentary projections on a nut, which fits over the bolt, and thereby prevents lateral movement of such nut when the fastened component is jarred.

On the other hand, unlike components that merely require mounting or fastening as above, components and operating subsystems such as the paper registration assembly of the copier or printer, must first be aligned precisely for proper operation within the copier or printer, before they are then mounted to the support frame therein. Those of such subsystems which must thereafter be removed from the copier or printer, serviced and then remounted, typically are mounted or fastened as such with a screw or the like. However, unlike components that merely require mounting, these types of subsystems each include at least a screw or bolt mounting aperture that is substantially larger than the major diameter of the screw or bolt to be used, as well as, also larger than the cooperating screw or bolt aperture in the support frame. The larger aperture in the subsystem may for example be twice as large or larger than the cooperating aperture in the frame which itself should substantially be the same size as the major diameter of the screw or bolt to be used.

As such, the process of aligning the subsystem within the copier or printer involves essentially finding the precise position, through the much larger screw mounting aperture in the subsystem, in which then mounting the subsystem will result in a precise operational alignment of the subsystem within the copier or printer. This ordinarily is done each time such a subsystem is installed or mounted for operation within the copier or printer.

The reliability of such a subsystem and of the copier or printer, as well as, the quality of the copies they produce, depend significantly on the continued alignment of such subsystems, even after they have been serviced or replaced in the field.

Conventional methods and apparatus for first aligning and then mounting such copier or printer subsystems include for example initially aligning and mounting the subsystem by trial and error, then drilling at least four (4) close fitting pin holes through the machine frame and through the mounting portion or bracket of the subsystem. In order to avoid having to repeat the initial, often tedious and laborious trial and error aligning procedure during reinstallation, locating pins of appropriate size and length are then inserted to fill the four pin holes, and to thereby removably retain the mounting portion or bracket of the subsystem in an aligned position against the copier or printer frame. During such reinstallation, the subsystem is first mounted on the locating pins before then being again fastened to the support frame assumedly in an aligned position.

The drilling aspect of such a method, however, is undesirable because it introduces metal chips and the risk of rust to parts of an already assembled copier or printer. In addition, such drilling is expensive and is not always convenient or practical given the restricted mounting locations of some subsystems within the copier or printer. Furthermore, the close fitting locating pins can undesirably become unreliable if knocked and bent out of their initial aligned shapes.

SUMMARY OF THE INVENTION

It is an object of the present invention to provide an effective, save and reliable method and apparatus for first aligning by trial and error, and then mounting an operating subsystem of a copier or printer such that the subsystem can thereafter be removed from the copier or printer, serviced, and reinstalled or remounted therein in alignment without further need of such trial and error aligning thereof.

In accordance with the present invention, an aligning device is provided for aligning by precisely marking the trial and error achieved aligned position of, and then mounting in such position, a subsystem, of an electrostatographic copier or printer, including a mounting portion having a first screw mounting aperture therein substantially larger than the major diameter of the mounting screw being used for mounting or fastening such subsystem to a support frame after such trial and error aligning thereof, and such that such subsystem can thereafter be removed from the copier or printer, serviced, and then reinstalled or remounted in precise alignment therein without further need of such initial trial and error alignment.

The aligning device comprises a solid member that has first and second ends, a front side, and a back side suitable for moving over, and placing tightly, against the mounting portion of the subsystem. The device includes a second screw mounting aperture in the first end thereof formed from the front side clear through to the back side for mounting or fastening the subsystem therethrough. The second screw mounting aperture is substantially smaller than the first screw mounting aperture in the mounting portion of the subsystem so as to enable a substantial narrowing and precise marking of an aligned position through the first and larger screw mounting and alignment aperture when the aligning device is moved and placed in alignment over the mounting portion. The second screw mounting aperture is also substantially the same size as the major diameter of the mounting screw being used.

The device also includes a recess formed at one of its ends in the back side for forming a cavity against the mounting portion over which it is moved and placed during the trial and error aligning of the subsystem. Furthermore, in order to avoid repeating the initial, often tedious and laborious trial and error aligning of the subsystem after such subsystem has been removed, serviced and is being reinstalled, the device further includes first and second adhesive introduction small holes. Such holes are formed from the front side clear through into the recess, and hence into the cavity formed thereby. Adhesive introduced through one of the small holes into a cavity formed by the recess against the mounting portion of the subsystem when the second and smaller screw mounting aperture is in its narrowing and precise alignment marking position over the first and much larger aperture, will permanently bond the device to the subsystem, and thereby permanently and precisely narrow and align the first and larger aperture. As such, the subsystem thereafter can be removed, serviced, and reinstalled therethrough in precise alignment, without further need of such initial trial and error alignment thereof.

The method of the present invention includes the steps of (1) placing the back side of the device against the mounting portion of the subsystem thereby creating a cavity by positioning the recess therein against the mounting portion, (2) inserting a mounting screw or other similar fastener through the second screw mounting aperture in the device, through the first and much larger screw mounting aperture in gross alignment, and into a cooperating aperture in the support frame, (3) moving the subsystem, and hence the second smaller aperture over the first and much larger aperture, by trial and error into a precise aligned position within the copier or printer, (4) firmly mounting or fastening the mounting portion of the subsystem with the aligning device thereon to the support frame in such aligned position using the mounting screw or other fastener thereby laterally sealing the cavity, and (5) filling the cavity with an adhesive introduced through one of the small holes or perforations in the aligning device so as to permanently bond the aligning device to the mounting portion of the subsystem, and so as to permanently narrow and align the first and much larger aperture. So aligned and mounted, the subsystem thereafter can be removed, serviced and simply reinstalled or remounted in precise alignment without further need for such initial trial and error alignment thereof.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
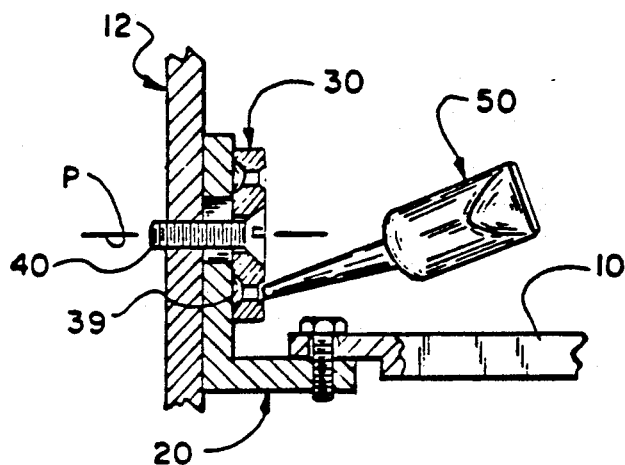
FIG. 1 is a side sectional view showing a copier or printer subsystem mounted in an aligned position according to the present invention.

According to FIG. 1, a copier or printer operating subsystem, such as the copy sheet registration assembly, is designated generally as 10, and is shown mounted in an aligned position P from which it can be removed, serviced, and simply remounted or reinstalled in alignment without further need for trial and error alignment thereof. The subsystem 10 is shown mounted to a support frame 12 by means of (a) a mounting portion 20, (b) an aligning device 30 for initially aligning by marking the aligned position P through the mounting portion 20, and for forming a laterally sealed cavity 39 with the mounting portion 20, (c) a mounting or fastening means such as a mounting screw 40, and (d) an adhesive 50 for permanently bonding the aligning device to the mounting portion 20, thereby also permanently aligning and marking the aligned position P through the mounting portion 20.

Figure 2A:
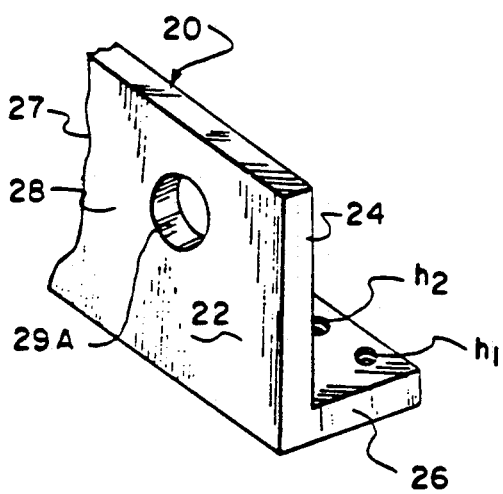
FIG. 2A is a perspective view of an alignment bracket equivalent to a mounting portion with a circular-type alignment and screw mounting aperture.
Figure 2B:
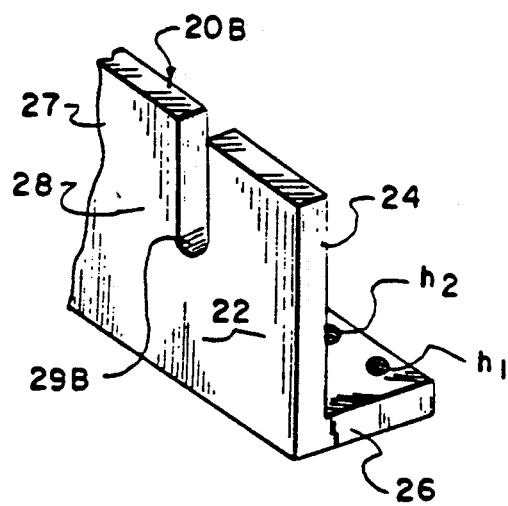
FIG. 2B is a perspective view of a similar bracket with a slot-type alignment and screw mounting aperture.

The subsystem 10 may come with a mounting portion 20 ready for aligning and mounting, or it may be necessary to use an alignment bracket to form such a mounting portion on the subsystem. Such an alignment bracket 20 as best shown in FIG. 2A is selected so that it is strong and rigid enough to carry the subsystem 10. Additionally, such a bracket or mounting portion 20 should have flat and smooth front and rear surfaces 22, 24, and at least first and second ends 26, 27. The first end 26 may have a plurality of small mounting holes h1, h2 formed to closely fit the fastening means used to fasten the subsystem 10 to the bracket if necessary. The holes h1, h2 may also be formed by the fastening means during such fastening. The second end 27 has a surface area 28 through which is formed a first screw mounting and alignment aperture 29A. Such an aperture can also be a slot 29B in a slotted type mounting portion or bracket 20B as shown in FIG. 2B. Where the subsystem 10 comes with a mounting portion 20 already in place, the surface area 28 and the screw mounting and alignment aperture 29A or 29B will accordingly be associated instead with such mounting portion.

Figure 3A:
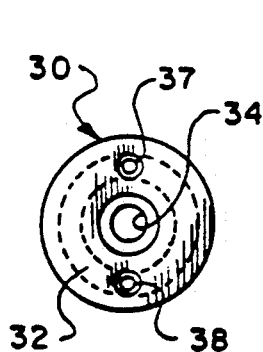
FIG. 3A is a front view of a disc-type aligning device.
Figure 3B:
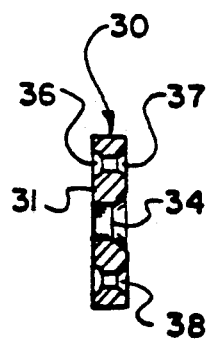
FIG. 3B is a sectional view of the disc-type aligning device showing the back side recess and the adhesive introduction small holes or perforations therein.

FIGS. 3A and 3B show a disc-type aligning device 30. The disc 30 has back and front sides 31, 32, and a second screw mounting and alignment aperture 34. The disc 30 is preferably made from a solid flat but strong piece of metal such as stainless steel. The diameter of the disc 30 must be substantially greater than the diameter of the first aperture 29A. On the other hand, the diameter of the second screw mounting aperture 34 therein must be substantially smaller than that of the first aperture 29A. The back side 31 of the device 30 further includes a recess 36 suitable for forming a cavity 39 (FIG. 1) when positioned or cupped against the surface area 28 of the mounting portion 20 of the subsystem 10.

The recess 36 is shown, for example, as a groove that is spaced from, and that completely surrounds the second screw mounting aperture 34, but it may also assume other forms suitable for forming the cavity 39. The disc-type device 30 is used preferably for aligning and mounting a subsystem including a mounting portion having a circular first screw mounting and alignment aperture 29A. This is in order to ensure a laterally and completely sealed or enclosed cavity 39. In addition to the second aperture 34, at least two small holes or perforations 37, 38 are formed within the recess 36 from the front side 32 clear through to the back side 31 so as to provide access into the cavity 39 for the introduction of the adhesive 50.

Figure 4A:
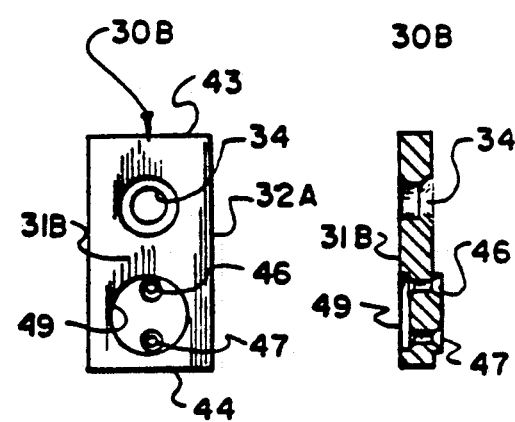
FIG. 4A is a front view of a strip-type or generally rectangular aligning device.
Figure 4B:
FIG. 4B is a sectional view of the strip-type aligning device showing a different arrangement of the screw mounting aperture and the back side recess.

FIGS. 4A and 4B show another embodiment of the aligning device which is a strip-type or generally rectangular member. The device 30B preferably is to be used with a slotted type mounting portion 20B such as that illustrated in FIG. 2B. The strip 30B has a flat smooth back side 31B, and a front side 32B, as well as, first and second ends 43, 44. Strip 30B can be made of a solid, flat but strong piece of metal such as stainless steel but must be wider than, and longer than, the screw mounting and alignment aperture 29B over which the device 30B is to be moved and placed for alignment. The strip 30B also has a second screw mounting and alignment aperture 34 therein that is formed in the first end 43 and has a diameter which is substantially less than the width of the slot 29B. The second end 44 has at least two small adhesive introduction holes or perforations 46, 47 located within a recess 49 formed in the back side 31B.

Figure 5:
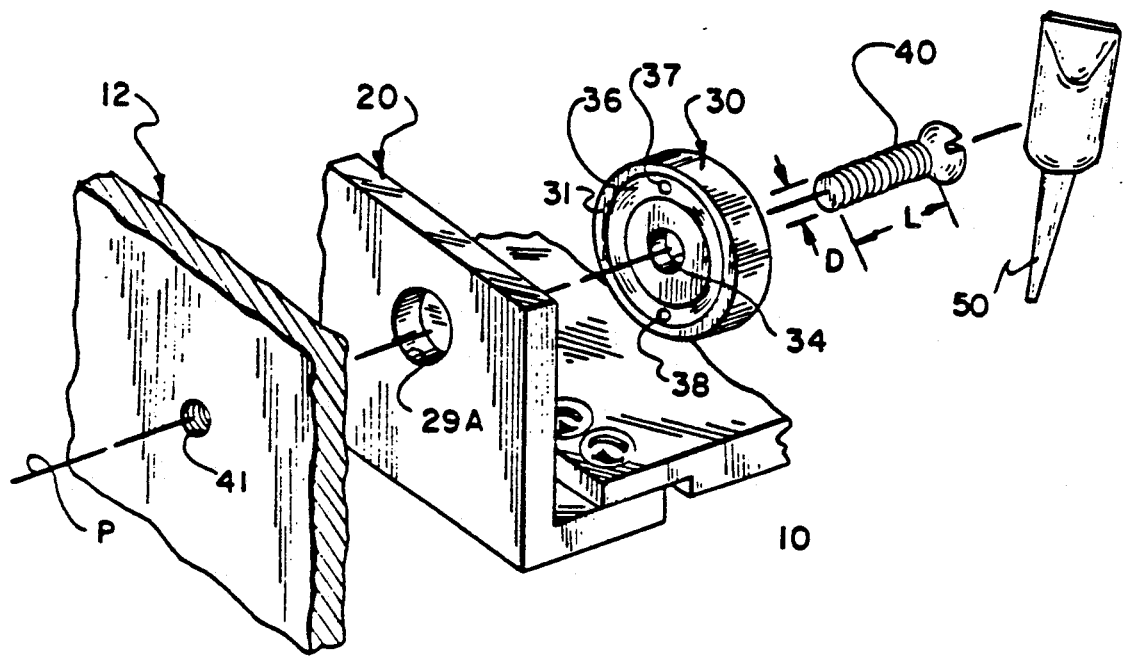
FIG. 5 is an exploded perspective view of components illustrating the method and apparatus of the present invention using a disc-type aligning device in the case of the mounting portion, of a subsystem, having a circular alignment and screw mounting aperture.

Referring to FIG. 5, a mounting means, such as a screw 40, is provided for mounting or fastening the mounting portion or bracket 20, with the device 30 thereon, to the copier or printer frame 12. In order to obtain a tight and close fit with such means, the diameter of such means, for example the major diameter D of the screw 40, is made substantially equal to the diameter of the second screw alignment and mounting aperture 34 of the aligning device, as well as, equal to the diameter of a cooperating screw mounting and support hole 41 in the support frame 12. In addition, the length of the mounting means, such as the length L of the screw 40, is sufficient to pass through the aligning device and through the mounting portion or bracket 20, and still substantially penetrate the frame 12.

FIG. 5 also illustrates the adhesive 50 for permanently bonding the aligning device 30 to the mounting portion 20 when the second screw mounting aperture 34 is in its narrowing and precise alignment marking position over the first and much larger aperture 29A or 29B of the mounting portion 20. The adhesive 50 may be any one of a variety of structural adhesives such as an acrylic or an epoxy type adhesive. Actually, the type selected may depend on the particular application, especially on the weight of the component being aligned, and on whether the orientations of the pieces being bonded are vertical or horizontal. If necessary, however, the type of adhesive selected may be thickened in order to prevent undesirable flow after application.

Referring again to the exploded view of FIG. 5, and to FIGS. 2 to 4, the method of the present invention for first aligning, and then mounting the subsystem 10 includes placing the back side 31 of the aligning device 30 against the mounting portion 20. The aligning device 30 is positioned thus such that the second screw mounting aperture 34 is directly over the first and larger screw mounting and alignment aperture 29A thereby narrowing it, and such that the recess 36 in the back side 31 of the aligning device 30 forms a cavity 39 by cupping over the surface area 28 of the mounting portion 20. A removable mounting means such as a screw 40, that has a major diameter D substantially equal to the diameter of the second aperture 34, as well as, to that of the support frame hole 41, is inserted through the second aperture 34, through the first and larger screw mounting aperture 29A, in gross alignment, and then into the support frame hole 41, thereby supporting the subsystem 10 in gross alignment against such frame 12. Supported as such, the subsystem 10 can be moved tediously and laboriously by trial and error for precise alignment in as many directions, and as far as the first screw mounting and alignment aperture 29A of the mounting portion 20 is free to move about the fastening means or screw 40. Such movement of the subsystem 10 also moves the second aperture 34 over the first and much larger aperture 29A.

As such, a precise alignment position P through the aperture 29A of the mounting portion 20 can be achieved relative to the aperture 34 and hole 41. When the position P is thus achieved, the screw 40 is then driven firmly into the hole 41 in the support frame 12, thereby mounting or fastening the mounting portion 20, with the device 30 thereon, against the support frame 12. Such mounting or fastening laterally and completely seals the cavity 39 formed by the recess 36 against the mounting portion 20.

The adhesive 50 is thereafter introduced into the cavity 39 through one of the adhesive introduction holes or perforations 37 or 38, until the cavity is filled with such adhesive. The adhesive going in through one perforation forces air within the cavity out the other perforation. Any excess adhesive is wiped off and the quantity introduced into the cavity is allowed to cure, permanently bonding the aligning device 30 to the mounting portion 20 in such aligned position P, and also permanently narrowing and precisely aligning the first and much larger aperture 29A of the mounting portion 20. Precisely aligned and mounted as such, the subsystem 10, thereafter, can be removed by removing the screw 40 or other similar fastener, serviced, and then simply reinstalled or remounted in the aligned position P, without further need of such initial trial and error alignment thereof.

Figure 6:
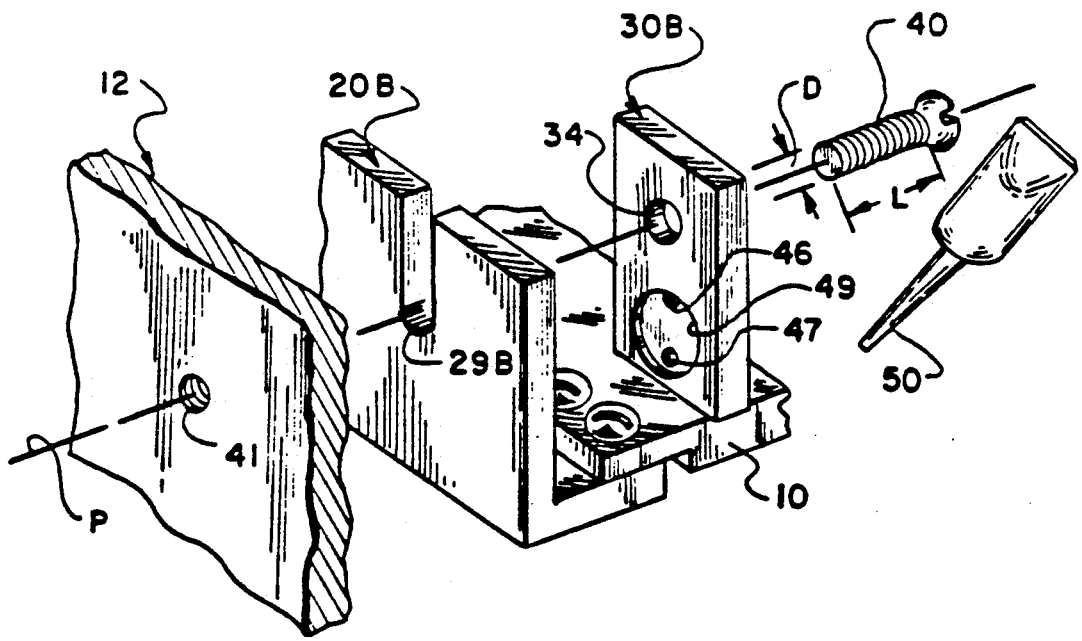
FIG. 6 is similar to FIG. 5 except that it involves the case of the mounting portion, of a subsystem, having a slot type alignment and screw mounting aperture and a strip-type aligning device.

The invention as described according to FIG. 5, can also be practiced as illustrated in FIG. 6 where the subsystem 10 includes a mounting portion having a slot-type first aperture 29B. Accordingly, a slotted-end bracket 20B as shown in FIGS. 2B and 6, if necessary, may be substituted for bracket 20, and a generally rectangular or strip-type aligning device 30B as shown in FIGS. 4A, 4B and 6, may be substituted for the disc-type aligning device 30 of FIG. 5.

Although the present invention has been described with respect to its particularly usefulness in electrostatographic reproduction equipment such as copiers and printers, it is understood that the invention is equally useful in any machine for so aligning, and then mounting an operating subsystem within such machine such that the subsystem thereafter can removed, serviced, and then reinstalled or mounted in alignment without further need of initial trial and error aligning thereof.

Additionally, although the above detailed description has been made with particular reference to a preferred embodiment, it will be understood that variations and modifications can be effected within the spirit and scope of the invention.

What is claimed is:

1. A device for aligning by precisely marking the trial and error achieved aligned position of, and then fastening in such position, a subsystem, of an electrostatographic copier or printer, including a mounting portion having a first alignment and screw mounting aperture therein substantially larger than a major diameter of a mounting screw being used for fastening such subsystem to a support frame, after such trial and error aligning thereof, such that the subsystem can thereafter be removed from the copier or printer, serviced, and then reinstalled in such precise aligned position therein without further need of such initial trial and error alignment thereof, the device comprising:

(a) a solid member having first and second ends, a front side, and a back side suitable for moving over, and placing tightly, against the mounting portion of such subsystem;

(b) a second screw mounting aperture formed in said first end from said front side clear through to said back side for aligning and mounting or fastening the subsystem therethrough, said second screw mounting aperture being substantially smaller than said first screw mounting aperture in said mounting portion for substantially narrowing and precisely marking an aligned position through said first and larger aperture, and said second screw mounting aperture being substantially the same size as the major diameter of the mounting screw being used for mounting such subsystem therethrough to the support frame;

(c) a recess formed at one of said ends in said back side for forming a cavity and holding adhesive against such mounting portion of the subsystem; and (d) first and second adhesive introduction perforations at said second end formed from said front side clear through into said recess in said back side, for introducing an adhesive therethrough into the cavity formed by said recess against such mounting portion, thereby permanently bonding said aligning device against such mounting portion, and thereby permanently narrowing and marking such precise aligned position through said first and larger aperture such that the subsystem thereafter can be removed with the aligning device bonded thereto, serviced, and reinstalled in precise alignment without further need of such trial and error alignment thereof.

2. The device of claim 1 wherein said aligning device has a strip of generally rectangular periphery.

3. The device of claim 1 wherein said aligning device has a disc-shaped periphery.

4. The device of claim 1 wherein said recess is formed in said back side at said first end the same as said second screw mounting aperture.

5. A device for aligning by precisely marking the trial and error achieved aligned position of, and then fastening in such position, an operating subsystem, of a machine, including a mounting portion having a first alignment and screw mounting aperture therein substantially larger than a major diameter of a mounting screw being used for fastening such subsystem to a support frame, after such trial and error aligning thereof, such that the subsystem can thereafter be removed from such machine, serviced, and then reinstalled in such precise aligned position therein without further need of such initial trial and error alignment thereof, the device comprising:

(a) a solid member having first and second ends, a front side, and a back side suitable for moving over, and placing tightly, against the mounting portion of such subsystem;

(b) a second screw mounting aperture formed in said first end from said front side clear through to said back side for aligning and fastening the subsystem therethrough, said second screw mounting aperture being substantially smaller than said first screw mounting aperture in said mounting portion for substantially narrowing and precisely marking an aligned position through said first and larger aperture, and said second screw mounting aperture being substantially the same size as the major diameter of the mounting screw being used for mounting such subsystem therethrough to the support frame;

(c) a recess formed at one of said ends in said back side for forming a cavity and holding adhesive against such mounting portion of the subsystem; and (d) first and second adhesive introduction perforations at said second end formed from said front side clear through into said recess in said back side, for introducing an adhesive therethrough into the cavity formed by said recess against the mounting portion, thereby permanently bonding said aligning device against the mounting portion, and thereby permanently narrowing and marking such precise aligned position through said first and larger aperture such that the subsystem thereafter can be removed with the aligning device bonded thereto, serviced, and reinstalled in precise alignment without further need of such trial and error alignment thereof.

6. A device for aligning by precisely marking the trial and error achieved aligned position of, and then mounting or fastening in such position, a subsystem, of an electrostatographic machine, including a mounting portion having a first alignment and screw mounting aperture therein substantially larger than a major diameter of a mounting screw being used for fastening such subsystem to a support frame, after such trial and error aligning thereof, such that the subsystem can thereafter be removed from the machine, serviced, and then reinstalled in such precise aligned position therein without further need of such initial trial and error alignment thereof, the device comprising:

(a) a solid member having a front side, and a back side suitable for moving over, and placing tightly, against the mounting portion of such subsystem;

(b) a second screw mounting aperture formed from said front side clear through to said back side for aligning and fastening the subsystem therethrough, said second screw mounting aperture being substantially smaller than said first screw mounting aperture in the mounting portion for substantially narrowing and precisely marking an aligned position through said first and larger aperture, and said second screw mounting aperture being substantially the same size as the major diameter of the mounting screw;

(c) a recess formed in said back side for forming a cavity and holding adhesive against the mounting portion of the subsystem; and (d) first and second adhesive introduction perforations formed from said front side clear through into said recess in said back side, for introducing an adhesive therethrough into the cavity formed by said recess against the mounting portion, thereby permanently bonding said aligning device against the mounting portion, and thereby permanently narrowing and marking such precise aligned position through said first and larger aperture such that the subsystem thereafter can be removed along with the aligning device bonded thereto, serviced, and reinstalled in precise alignment without further need of such trial and error alignment thereof.

* * * * *